United States Patent
Perruchot et al.

(10) Patent No.: US 8,908,030 B2
(45) Date of Patent: Dec. 9, 2014

(54) STABILIZED-IMAGE TELEMETRY METHOD

(75) Inventors: Ludovic Perruchot, Bonnelles (FR); Denis Rabault, Boulogne-Billancourt (FR); Patrick Seugnet, Chatillon (FR); Olivier Cocle, Sceaux (FR)

(73) Assignee: Thales, Neuilly sur Seine (FR)

( * ) Notice: Subject to any disclaimer, the term of this patent is extended or adjusted under 35 U.S.C. 154(b) by 887 days.

(21) Appl. No.: 12/677,793

(22) PCT Filed: Aug. 27, 2008

(86) PCT No.: PCT/EP2008/061256
§ 371 (c)(1),
(2), (4) Date: Mar. 11, 2010

(87) PCT Pub. No.: WO2009/033956
PCT Pub. Date: Mar. 19, 2009

(65) Prior Publication Data
US 2010/0182426 A1 Jul. 22, 2010

(30) Foreign Application Priority Data

Sep. 14, 2007 (FR) ..................................... 07 06464

(51) Int. Cl.
*H04N 7/18* (2006.01)
*F41G 3/02* (2006.01)
*G01C 3/04* (2006.01)
*F41G 3/06* (2006.01)
*G01S 17/02* (2006.01)

(52) U.S. Cl.
CPC .. *G01C 3/04* (2013.01); *F41G 3/02* (2013.01); *F41G 3/06* (2013.01); *G01S 17/023* (2013.01)
USPC ......................................................... 348/135

(58) Field of Classification Search
USPC .................................. 359/554; 348/158, 135
See application file for complete search history.

(56) References Cited

U.S. PATENT DOCUMENTS

| | | | |
|---|---|---|---|
| 5,654,752 A * | 8/1997 | Yamazaki | 348/208.8 |
| 5,850,576 A * | 12/1998 | Matsuzawa | 396/55 |
| 6,069,656 A * | 5/2000 | Silver | 348/169 |
| 6,122,449 A * | 9/2000 | Satoh et al. | 396/55 |
| 6,177,671 B1 | 1/2001 | Fouilloy et al. | |
| 6,307,623 B1 | 10/2001 | Papuchon et al. | |
| 7,126,110 B2 * | 10/2006 | Papuchon et al. | 250/234 |
| 2006/0201047 A1 | 9/2006 | Lowrey, III | |
| 2007/0014003 A1 | 1/2007 | Zadravec | |

FOREIGN PATENT DOCUMENTS

WO 93/25926 A1 12/1993

* cited by examiner

*Primary Examiner* — Mehrdad Dastouri
*Assistant Examiner* — James Anderson, II
(74) *Attorney, Agent, or Firm* — Baker & Hostetler LLP

(57) ABSTRACT

The invention relates to a method of telemetry of a target performed by an operator by means of binoculars which comprise an image sensor, a display screen, a processing unit and a laser telemeter exhibiting a firing window centered on the sighting axis of the laser.

8 Claims, 3 Drawing Sheets

STABILIZED-IMAGE TELEMETRY METHOD

CROSS-REFERENCE TO RELATED APPLICATIONS

This application is a National Stage of International patent application PCT/EP2008/061256, filed on Aug. 27, 2008, which claims priority to foreign French patent application No. FR 07 06464, filed on Sep. 14, 2007, the disclosures of which are hereby incorporated by reference in their entirety.

FIELD OF THE INVENTION

The field of the invention is that of binoculars equipped with a laser telemeter. The term binoculars designates a portable imaging device intended to be held in the hand.

BACKGROUND OF THE INVENTION

We shall describe such binoculars.

They comprise, in a conventional manner, an observation channel which comprises an image sensor and a laser telemetry channel termed the laser channel; they also comprise a display screen common to the two channels on which the image arising from the image sensor appears and on which are positioned a firing reticle demarcating the sighting axis of the laser telemeter and a reticle demarcating the center of the image sensor. These reticles generally have the form of a cross. The laser beam of the telemeter is emitted in a very narrow sector typically of about 1 mrad, thus dictating very precise aiming of the laser. Harmonization, that is to say alignment of the axes between the laser channel and the observation channel, is performed in the factory. To telemeter the target, the operator points the binoculars so as to position the laser reticle on the target and then the shot is fired by pressing a push-button.

It is known practice to equip such binoculars with a device for stabilizing the image which makes it possible to compensate for the perturbing movements of the operator who is holding the binoculars in his hands. This stabilization makes it possible to keep the sighting axis of the observation channel constant in spite of small movements of the binoculars; these perturbing movements of the operator are limited to low frequencies with a high cutoff frequency of about 2 Hz. But the stabilization must not prevent tracking of the operator's movements that are not stabilization offsets but deliberate displacements of the binoculars by the operator such as a panoramic displacement movement when for example searching for a zone of interest. For this purpose the image is recentered continuously at very low frequency. Indeed, the erratic movements of the observer correspond to displacements of the binoculars of low amplitudes and of high temporal frequencies whereas deliberate movements correspond to displacements of large amplitudes and of low frequencies.

Through this stabilization, a stable image is therefore obtained but, as a consequence, the laser axis in this image shifts, and it is humanly difficult to aim at the target without moving for a long enough time to perform the telemetry firing; the previous firing procedure no longer works.

One solution consists in suppressing the stabilization during the telemetry phase.

Another solution consists in stabilizing the binoculars themselves as on bulkier equipment such as stabilized optronic turrets; such equipment uses mechanical devices which stabilize both the axis of the imaging channel and that of the channel of the laser telemeter.

SUMMARY OF THE INVENTION

The purpose of the invention is to avoid having to suppress the stabilization or having to resort to equipment that is stabilized so as to preserve the advantage of portable equipment.

The invention relates to a method of telemetry of a target performed by an operator by means of binoculars which comprise an image sensor, a display screen, a processing unit and a laser telemeter exhibiting a firing window centered on the sighting axis of the laser. It is chiefly characterized in that it comprises the following steps of:

capture by the image sensor of a so-called real image including the image of the target to be telemetered and display on the screen of a corresponding stabilized image, calculation by the processing unit of the shift $\Delta S$ between the real image and the stabilized image, and of the shift $d=\Delta S+\Delta_h$, $\Delta_h$ being a predetermined harmonization shift, positioning of the stabilized image of the target on a predetermined position P of the display screen, ordering of firing by the operator, display on the display screen of an element representative of the firing window of the telemeter, displacement by the operator of the binoculars of this firing window toward the position P of the screen, at a rate of displacement above a predetermined rate rt, firing of the laser shot by the processing unit as soon as $d<D_0$, $D_0$ being predetermined.

According to a first mode of utilization of the method, the position P for example at the center of the display screen is determined during the manufacture of the device, and it comprises a step of positioning the stabilized image of the target on said position by the operator by displacement of the binoculars. Thereafter, the operator displaces the window of the telemeter toward the position P of the screen, again by displacement of the binoculars. The image of the stabilized target hardly moves during this displacement since the rate rt of recentering of the stabilized image at P is much lower than the rate of this displacement of the firing reticle: the stabilization adjustment actually has a large inertia with respect to the displacement of the reticle by the operator. According to another mode of utilization, the position P is determined by automatic detection and identification of the target by an image processing device.

A delay exists between the firing order and the actual firing of the laser shot which involves a shift of the actual firing axis. According to a characteristic of the invention, it is possible to add a step of predictive filtering to compensate for this delay by anticipating the firing order.

The image sensor is for example a sensor operating in the visible spectral band or in the infrared bands.

The subject of the invention is also binoculars which comprise an image sensor, a viewing device with a display screen, a laser telemeter able to be demarcated on the display screen by a reticle, a device for stabilizing on the screen the images arising from the sensor, characterized in that it comprises means for calculating the distance d between the position of the reticle and the position of a predetermined element of the stabilized image and, linked to these means for calculating d, means for automatically triggering the telemeter as soon as this distance d is below a predetermined distance $D_0$.

BRIEF DESCRIPTION OF THE DRAWINGS

Other characteristics and advantages of the invention will become apparent on reading the detailed description which follows, given by way of nonlimiting example and with reference to the appended drawings in which.

DETAILED DESCRIPTION

From one figure to another, the same elements are labeled by the same references.

Figure 3:
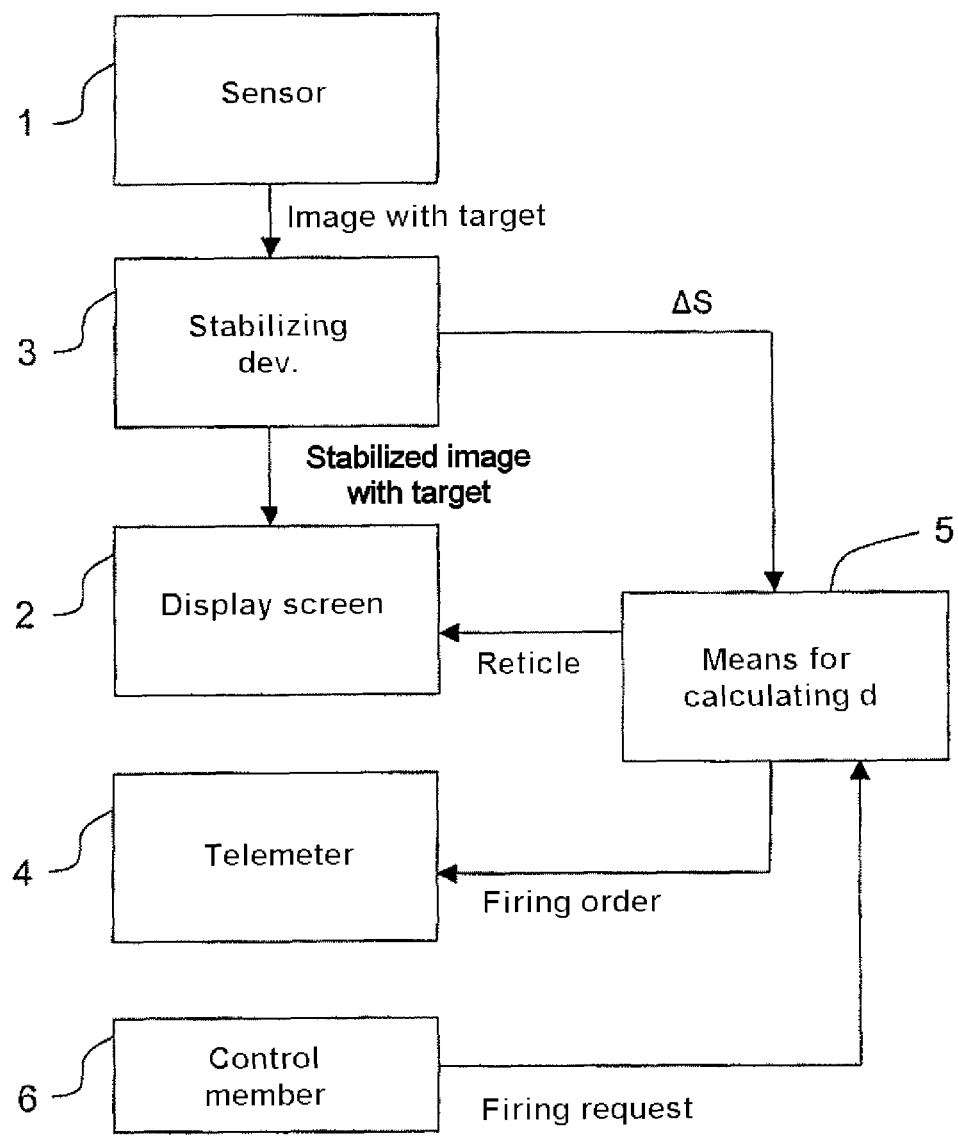

Binoculars, certain elements of which are represented in FIG. 3, conventionally comprise:
- an image sensor 1,
- a laser telemeter 4,
- a stabilizing device 3 which may comprise just a digital processing of the image or else use an angular measurement means such as a gyrometer or a gyroscope which delivers the rotations or the rotation rates of the binoculars to a processing unit able to calculate on the basis of these rotation rates, the stabilization offsets to be compensated,
- a viewing device with a display screen 2 comprising pixels, on which are displayed the stabilized images arising from the processing unit together with the reticles representative of the center of the observed field and of the sighting axis of the telemeter.

Binoculars generally create an angular representation of the observed field. The perturbing movements of the hands are then mainly rotational movements; the translations are negligible during observation of distant objects.

To detect the rotational movements of the binoculars, use is made of a gyroscope or a gyrometer tied to the binoculars, which provides a rotation or a rotation rate directly or with supplementary calculations. The image of the binoculars comprising pixels distributed in rows (x axis) and columns (y axis), there is preferably a gyroscope with two axes, one for the rows of pixels, the other for the columns. This gyroscope, which can be of various technologies, is typically a MEMS technology device, the acronym standing for the expression "Micro Electro Mechanical System" for micro structures produced on silicon. The data arising from the gyrometer are filtered by a high-pass filter in such a way that the stabilization does not interfere with the operator's deliberate movements for example when he intentionally scans a zone. These low-frequency images are used to determine for example by an optical flow scheme, the translations and rotations to be applied to the images to stabilize them. Next, the image is shifted on the display screen by a certain number of pixels, the shift being calculated by the software processing unit as a function of the filtered data of the gyroscope.

Figure 1A:
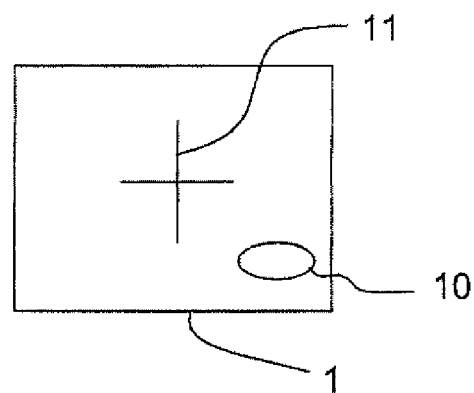
FIG. 1 schematically illustrate the image of a target recorded by the image sensor and the display on the display screen of the corresponding stabilized image, FIG. 2 schematically illustrate various steps of the method according to the invention, FIG. 3 schematically represents elements of binoculars according to the invention.
Figure 1B:
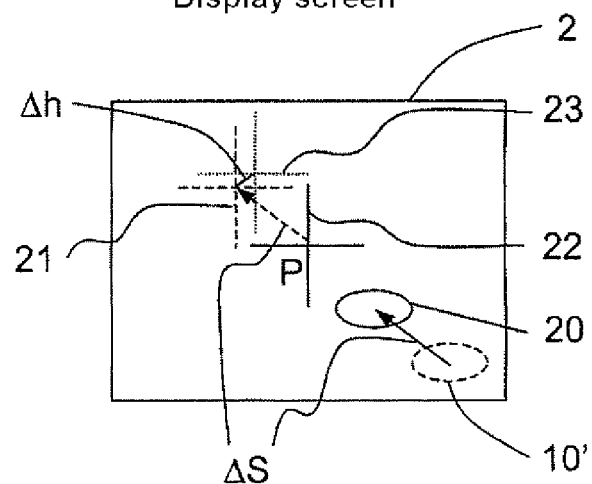
Figure 2A:
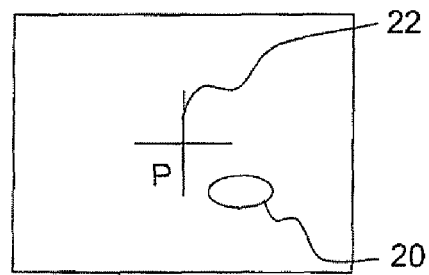
Figure 2B:
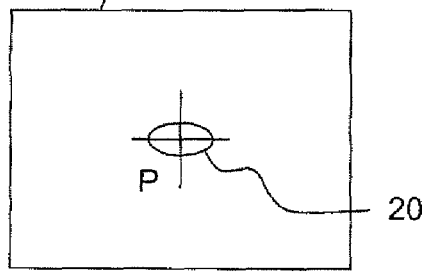
Figure 2C:
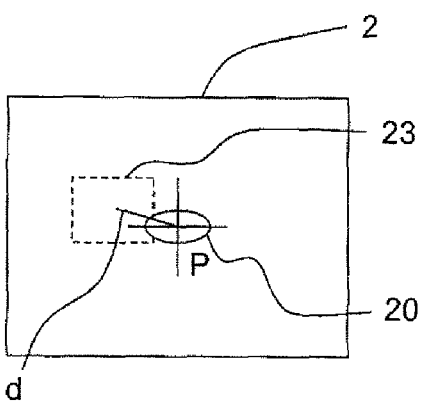
Figure 2D:
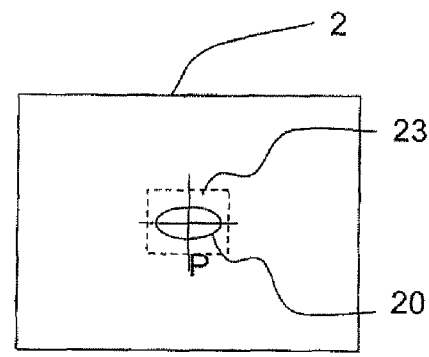

The principle of electronic image-stabilization is recalled in conjunction with FIG. 1. FIG. 1a represents the image sensor 1 on which are indicated the real image of the target 10 at an instant t and the reticle 11 of the center of the image sensor. FIG. 1b represents the display screen 2 of the viewing device on which are indicated the stabilized image 20 of the target at the same instant t and the reticle 22 of the center of the display screen 2, together with the shift $\Delta S$ between the real image 10' and stabilized image 20 of the target to which the shift between the reticles of the image sensor 21 and of the display screen 22 corresponds.

As $\Delta S + \Delta_h$ is known, it is possible to demarcate the laser axis on the display screen 2; it is shifted by $\Delta_h$ from the reticle of the image sensor, $\Delta_h$ being the predetermined harmonization shift, i.e. by $\Delta S + \Delta_h$ with respect to the reticle of the center of the display screen 2. But knowing $\Delta S + \Delta_h$ does not make it possible to fire the shot since the system does not know the position of the target: the target has to be designated.

A first scheme consists in the operator displacing the laser reticle on the stabilized target which is on the screen of the viewing device, and in stopping the stabilization while firing the laser shot, but this scheme is not easy with hand-held binoculars.

According to the invention, the designation of the target comprises the two steps consisting in positioning the target on the center P of the screen of the viewing device, and then in positioning on this center the laser firing axis demarcated by its reticle; more generally, it is possible to choose for P a position other than the center of the screen from the moment the distance d is calculated with respect to this position. The solution of the invention is based on automatic firing, the system taking over from the operator as soon as the latter has given the firing order; the stabilized image of the target is designated to the system by the operator who centers this stabilized image on a position P, demarcated for example by the reticle 22 of the display screen 2, and gives the order to fire as soon as the centering is obtained. The positioning of the target on P is fairly stable since it is carried out at a very low frequency, much lower than a Hertz and much lower than the destabilization frequency, which is close to 0.5 Hz. The destabilization frequency is that of the perturbing movements of the operator. After designation, it is possible to demarcate the laser axis with the limits of the beam and start the recentering procedure, and automatic firing.

The method according to the invention comprises the following steps described in conjunction with FIG. 2:
- display on the screen 2 of a stabilized image 20 which includes the image of the target to be telemetered (FIG. 2a),
- centering of the stabilized image 20 of the target toward the position P, here the center of the display screen, by displacement of the binoculars by the operator (FIG. 2b),
- as soon as the stabilized image 20 is properly positioned at P, the operator can give the firing order for example by pressing a push-button, and this may bring about moreover a fixing of the adjustment of the stabilizing device with the purpose of keeping the image still, for the time of the sequence,
- calculation by the processing unit of the shift $d = \Delta S + \Delta_h$, $\Delta_h$ being a predetermined harmonization shift,
- display on the screen 2 of the sighting axis of the laser and of its divergence in the form of a window 23 (a rectangle or a circle for example) demarcating the illumination cone (FIG. 2c); it is the firing window that the operator must place on the position P, knowing that this window is not stabilized but tracks the perturbing movements of the operator; this window is situated a distance d from the position P, this distance being equal to the stabilization shift d calculated previously,
- displacement of this window 23 toward the position P of the screen by displacement of the binoculars by the operator, while keeping the stabilized image 20 of the target on the position P of the screen 2, (FIG. 2d)
- firing of the laser shot by the processing unit as soon as $d < D_0$, $D_0$ being predetermined.

The translation of the firing window 23 toward the position P (here the center) of the screen is performed by the operator. In the course of this translation, the window 23 passes over the center P of the screen, or indeed goes past it with a very high probability. The operator cannot keep the position where the target and the firing window coincide for a long enough time to fire the laser shot, because of the perturbing movements of his hand: this translation toward the center of the screen can only be approximate. This is why the processing unit takes over during this step and triggers the firing itself when the offset is estimated to be small enough, that is to say as soon as it obtains d<$D_0$, $D_0$ being predetermined.

According to another embodiment, the position P of the target on the screen 2 is obtained by automatic target detection and identification carried out by an image processing unit which demarcates its choice by a positioning of P; the laser shot is fired as previously as soon as the distance d between the firing window and this labeled position P is below $D_0$. As previously, the operator seeks to make the laser reticle 23 coincide with the position P, which in the present case is no longer necessarily at the center of the screen.

To aid the detection device, in case several potential targets are present, a centering phase can be coupled with automatic detection.

A further step can be added which consists in taking into account the delay, if any, between the operator's firing order and the laser emission: a predictive filter is introduced to compensate for this delay by anticipating the firing order.

The following data are used:
Time t1 between the acquisition of the image and the computation of the stabilization offsets: this time comprises the image sensor reading delays, the information transfer times, the delays due to the synchronizations of the various tasks, the time for calculating the stabilization offsets and the delay time of the various filters.
Time t2 between the computation of the stabilization offsets and a firing request.
Time t3 between a firing request by the operator and an order to fire to the telemeter.
Time t4 that will be taken by the laser between a firing order and an actual firing.
Rate rt of the stabilization shifts (the rate is computed on the basis of the stabilization shifts and the time between two acquisitions).

The shift "shft" of the position of the target upon actual firing is predicted by:

$$shft = rt/(t1+t2+t3+t4)$$

The shift is added to the stabilization offset ΔS used to calculate d.

Binoculars according to the invention, described in conjunction with FIG. 3, comprise:
an image sensor 1,
a stabilizing device 3 which comprises a gyroscope and a processing unit,
a viewing device which comprises a viewing screen 2,
a telemeter 4 and means 5 for calculating d and for firing the laser shot,
a control member 6, such as a firing request push-button.

The image sensor 1 provides the captured so-called real images to the stabilizing device 3 which stabilizes them and transmits them to the viewing device for display in stabilized form; the stabilized image including the target is thus displayed on the viewing screen 2. The telemeter 4 is linked to the viewing device in such a way that when the operator has selected the telemetry mode, the reticle of the telemeter is displayed on the viewing screen 2 and displaced by the operator. The viewing device, the telemeter 4 and the stabilizing device 3 are linked to the means 5 for calculating the distance d. The calculation of d is optionally ensured by the stabilization processing unit.

The invention claimed is:

1. A method of telemetry of a target performed by an operator by means of binoculars which comprise an image sensor, a display screen, a processing unit and a laser telemeter-exhibiting a firing window centered on a sighting axis of the laser telemeter, the method comprising:
   capturing by the image sensor real image including an image of the target to be telemetered and display on the display screen of a corresponding stabilized image;
   positioning the corresponding stabilized image on a predetermined position P of the display screen;
   ordering a firing by the operator;
   displaying on the display screen of an element representative of the firing window of the laser telemeter and calculating shift d=ΔS+$Δ_h$, $Δ_h$ being a predetermined harmonization shift and ΔS being a calculated shift between the real image and the corresponding stabilized image is performed during a displacement of the element representative of the firing window toward the predetermined position P of the display screen by the operator of the binoculars, at a rate of displacement below a predetermined rate; and
   firing a laser shot by the processing unit as soon as d<$D_0$, $D_0$ being predetermined.

2. The method as claimed in claim 1, wherein the stabilized image is positioned on the predetermined position P by the operator.

3. The method as claimed in claim 1, wherein the predetermined position P is situated substantially at a center of the display screen.

4. The method as claimed in claim 1, wherein the predetermined position P is determined by detection and identification of the target.

5. The method as claimed in claim 1, further comprises a step of predictive filtering to compensate for a delay that exists between the firing order and the firing of the laser shot by anticipating the firing order.

6. The method as claimed in claim 1, wherein the image sensor is a sensor operating in a visible spectral band or in infrared spectral bands.

7. Binoculars which comprise an image sensor, a viewing device with a display screen, a laser telemeter able to be demarcated on the display screen by a reticle, a device for stabilizing on the display screen images arising from the image sensor, wherein the binocular comprises:
   means for calculating a distance d between a position of the reticle and a predetermined position P and,
   means for triggering the laser telemeter as soon as the distance d is below a predetermined distance $D_0$, wherein the means for triggering is linked to the means for calculating.

8. The binoculars as claimed in claim 7, wherein the image sensor is a sensor operating in a visible spectral band or in infrared spectral bands.

* * * * *